US012712802B2

(12) United States Patent
Saubhasik et al.

(10) Patent No.: US 12,712,802 B2
(45) Date of Patent: Aug. 18, 2026

(54) EQUAL-COST MULTI-PATH (ECMP) ROUTING WITH RESILIENCY AND CONSISTENT ORDERING

(71) Applicant: Arista Networks, Inc., Santa Clara, CA (US)

(72) Inventors: Mayukh Saubhasik, Richmond (CA); Nam Anh Tran, Vancouver (CA); Vahab Akbarzadeh, Burnaby (CA)

(73) Assignee: Arista Networks, Inc., Santa Clara, CA (US)

( * ) Notice: Subject to any disclaimer, the term of this patent is extended or adjusted under 35 U.S.C. 154(b) by 601 days.

(21) Appl. No.: 17/871,664

(22) Filed: Jul. 22, 2022

(65) Prior Publication Data

US 2024/0031271 A1 Jan. 25, 2024

(51) Int. Cl.
*H04L 45/00* (2022.01)
*H04L 45/24* (2022.01)

(52) U.S. Cl.
CPC .............. *H04L 45/00* (2013.01); *H04L 45/24* (2013.01)

(58) Field of Classification Search
None
See application file for complete search history.

(56) References Cited

U.S. PATENT DOCUMENTS 8,351,429 B2 1/2013 Assarpour
8,787,400 B1 7/2014 Barth et al.
8,972,602 B2 3/2015 Mithyantha
9,571,400 B1 2/2017 Mandal et al.
9,853,900 B1 12/2017 Mula et al.
2008/0049609 A1 2/2008 Chao et al.
2010/0074103 A1 3/2010 Menth et al.
2010/0146121 A1* 6/2010 Schwimer ........... H04L 61/5007 709/226
2011/0060844 A1* 3/2011 Allan ...................... H04L 45/00 709/241
2012/0163389 A1* 6/2012 Zhang ................... H04L 47/125 370/400
2013/0060922 A1* 3/2013 Koponen ............. H04L 41/122 709/223
2015/0120779 A1* 4/2015 Lin ..................... G06F 21/6227 707/783

(Continued)

*Primary Examiner* — Sudesh M. Patidar
*Assistant Examiner* — Justin Michael Whitaker
(74) *Attorney, Agent, or Firm* — Treyz Law Group; Jason Tsai

(57) ABSTRACT

A method of operating a network device is provided. The method may include updating a software forwarding table in response to a link between the network device and one or more next hops device being disconnected or connected. The software forwarding table may list next hop devices currently available or connected to the network device for a given destination prefix. The method may include determining whether to update a hardware forwarding table also associated with the given destination prefix depending on whether one or more criteria have been satisfied. The hardware forwarding table may be updated in accordance with a resilient mode or an ordered mode. The resilient mode takes into account history information associated with the hardware forwarding table, whereas the ordered mode does not take into account the history information associated with the hardware forwarding table.

12 Claims, 11 Drawing Sheets

(56) References Cited

U.S. PATENT DOCUMENTS

| | | | | |
|---|---|---|---|---|
| 2016/0119229 | A1* | 4/2016 | Zhou | H04L 12/4633 370/392 |
| 2017/0012880 | A1* | 1/2017 | Yang | H04L 45/16 |
| 2020/0366593 | A1* | 11/2020 | Kaplan | H04L 45/308 |

* cited by examiner

EQUAL-COST MULTI-PATH (ECMP) ROUTING WITH RESILIENCY AND CONSISTENT ORDERING

BACKGROUND

A communication system includes multiple network devices that are interconnected to form a network for conveying packets from a source device to a destination device. Each network device such as a router connecting the source device to the destination device routes data packets in accordance with a forwarding information base (FIB), sometimes referred to as a forwarding table. The forwarding table lists possible next hop network devices for forwarding an incoming data packet towards the source device.

In equal-cost multi-path (ECMP) routing, the forwarding table will list next hop network devices that provide equal routing cost for data packets intended for the same destination device. Consider a scenario in which data packets intended for a given destination device arrives at a first router that routes according to a first forwarding table listing ECMP next hops for the first router and in which data packets intended for the given (same) destination device arrives at a second router that routes according to a second forwarding table listing ECMP next hops for the second router. As links with the next hop devices associated with the first and second routers get established and disconnected in different orders, the first and second forwarding tables of the two routers may begin to diverge, leading to more unpredictable routing between the source and destination devices.

DETAILED DESCRIPTION

A network device such as a router may be coupled to one or more next hop devices via multiple equal-cost paths. A software forwarding table stored on the network device may list currently available next hop devices for a given destination prefix and is sometimes referred to as a software forwarding equivalence class (FEC) forwarding table or a system FEC forwarding information base. A hardware forwarding table stored on the network device may be a table of a fixed size listing resilient next hop devices for the given destination prefix and is therefore sometimes referred to as a hardware forwarding equivalence class (FEC) forwarding table or a platform FEC forwarding information base. Software and hardware FEC forwarding tables associated with the same destination prefix or forwarding equivalence class are said to correspond with one another.

The network device may have a configured capacity for each destination prefix. The network device may update its software and hardware forwarding tables whenever a next hop device is added or removed for the given destination prefix or whenever a link between network device and one or more next hop devices is disconnected or established. If the number of links in the software forwarding table is less than the configured capacity, the network device may update its hardware forwarding table in accordance with a resilient mode that takes into account history information associated with the hardware forwarding table to ensure minimal disruption to existing traffic flows to the given destination prefix while maintaining an even distribution of traffic among the currently connected next hop devices.

Figure 1:
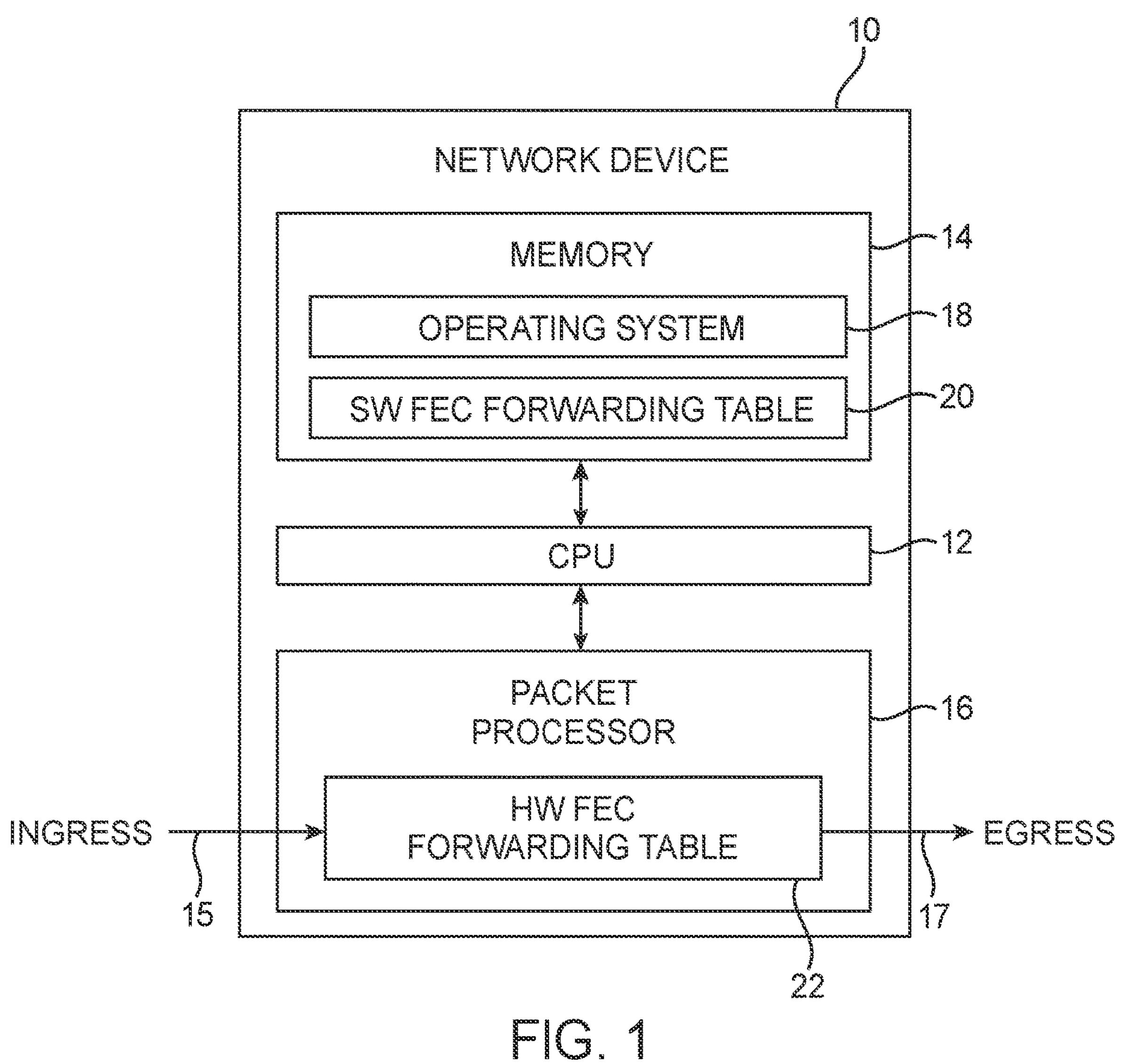
FIG. 1 is a diagram of an illustrative network device configured to route data packets in accordance with some embodiments.

If the number of links in the software forwarding table is at or equal to the configured capacity (i.e., at steady state), the network device may update its hardware forwarding table in accordance with an ordered mode that ignores the history information and enforces a consistent and deterministic ordering of next hop devices as specified by the sorted order of next hop devices listed in the corresponding software forwarding table. Configured and operated in this way, consistent and deterministic traffic distribution and flow can be achieved during the ordered mode when the number of equal-cost links is at capacity while minimal traffic flow disruptions can be achieved during the resilient mode when the number of equal-cost links is below capacity. FIG. 1 is a diagram of a network device such as network device 10 that is capable of routing packets using a resilient mode and an ordered mode. Network device 10 may be a router, a switch, a bridge, a hub, a repeater, a firewall, a device serving other networking functions, a device that includes a combination of these functions, or other types of network elements. As shown in FIG. 1, network device 10 may include processing circuitry such as a central processing unit (CPU) 12, storage circuitry including memory 14, and a packet processing circuit such as packet processor 16. In general, processing unit 12 may represent processing circuitry based on one or more microprocessors, graphics processing units (GPUs), host processors, general-purpose processors, microcontrollers, digital signal processors, application specific integrated circuits (ASICs), application specific system processors (ASSPs), programmable logic devices such as field-programmable gate arrays (FPGAs), a combination of these processors, or other types of processors. Central processing unit 12 may sometimes be referred to herein as a processor 12.

Processor 12 may be used to run a network device operating system such as operating system (OS) 18 and/or other software/firmware that is stored on memory 14. Memory 14 may include non-transitory (tangible) computer readable storage media that stores operating system 18 and/or any software code, sometimes referred to as program instructions, software, data, instructions, or code. Memory 14 may include nonvolatile memory (e.g., flash memory or other electrically-programmable read-only memory configured to form a solid-state drive), volatile memory (e.g., static or dynamic random-access memory), hard disk drive storage, and/or other storage circuitry. The processing circuitry and storage circuitry described above are sometimes referred to collectively as control circuitry. Processor 12 and memory 14 are sometimes referred to as being part of a control plane of network device 10.

Components in the control plane of network device 10 may exchange network topology information with other network devices and construct routing tables such as software forwarding table 20 using a routing protocol. Routing protocols are software mechanisms by which multiple network devices communicate and share information about the topology of the network and the capabilities of each network device. For example, network routing protocols may include Border Gateway Protocol (BGP) or other distance vector routing protocols, Enhanced Interior Gateway Routing Protocol (EIGRP), Exterior Gateway Protocol (EGP), Routing Information Protocol (RIP), Open Shortest Path First (OSPF) protocol, Label Distribution Protocol (LDP), Multiprotocol Label Switching (MPLS), Immediate system-to-immediate system (IS-IS) protocol, or other Internet routing protocols (just to name a few).

Software forwarding table 20 may be stored on memory 14. Software forwarding table 20, sometimes referred to as a software (system) forwarding information base (FIB), may be a data structure that stores information that is used to determine where data packets traveling over a network will be directed. A data packet is a formatted unit of data conveyed over the network. Data packets conveyed over a network are sometimes referred to as network packets. A group of data packets intended for the same destination should have the same forwarding treatment. A data packet typically includes control information and user data (payload). The control information in a data packet can include information about the packet itself (e.g., the length of the packet and packet identifier number) and address information such as a source address and a destination address. The source address represents an Internet Protocol (IP) address that uniquely identifies the source device in the network from which a particular data packet originated. The destination address represents an IP address that uniquely identifies the destination device in the network at which a particular data packet is intended to arrive.

Each IP address may include a network portion (sometimes referred to as a network prefix) and a host portion. Consider, for example, an IPv4 address, which is a 32-bit number that uniquely identifies a device within a network. An IPv4 address is formatted as four 8-bit fields (octets), typically represented using decimal numbers separated by periods. An IPv4 address can be annotated using the Classless Inter-Domain Routing (CIDR) notation, which is a shorthand for representing an IP address and its associated network (subnet) mask. Consider the following expression as an example:

192.0.2.1/24 (1)

The numbers before the "/" is the IP address, whereas the number after the "/" is the prefix length (size). The prefix length defines the width of the network prefix in number of bits, which defines the number of bits in a particular network. In expression (1) above, the prefix size of 24 indicates that the most significant 24 bits in the preceding IP address represents the network prefix, which in this case is equal to the first three octets "192.0.2". The network prefix is sometimes referred to as the network address. The remaining octet "1" is the host address or the host identifier. Here, since there is only one octet (i.e., 8 bits) remaining for the host address portion, there can be 2^8 or 256 possible IPv4 host addresses belonging to this particular network prefix 192.0.2.

Consider the following expression as another example:

192.0.2.1/16 (2)

In expression (2) above, the prefix size is 16, which indicates that the most significant 16 bits in the IP address represents the network prefix, which in this case is equal to the first two octets "192.0". The remaining two octets "2.1" is the host address or the host identifier. Here, since there are now two octets (i.e., 16 bits) remaining for the host address portion, there can be 2'16 or more than 64000 IPv4 host addresses belonging to this particular network prefix 192.0. Network device configurations that use the IPv4 addressing scheme are sometimes described herein as an example. This is, however, merely illustrative. In general, the embodiments herein can also be applied or extended to network device configurations that use the IPv6 addressing scheme or other types of network addressing schemes.

Data packets arriving at network device 10 that are intended for the same destination network should have the same or similar forwarding treatment. Data packets intended for the same destination network have packet header fields with the same destination IP address with the same prefix length. In other words, these data packets intended for the same destination network address are said to have the same network prefix or the same "destination prefix." Destination IP addresses can be matched with the longest destination prefix and forwarded accordingly. The host address may be the same or different. In the context of an MPLS network, any two data packets having destination IP addresses with the same network prefix are considered to be part of or assigned to the same forwarding equivalence class (FEC). Each network device 10 receiving a data packet can examine the header fields in the data packet and assign that data packet to a particular FEC depending on its destination prefix.

Network device 10 can receive data packets associated with one or more FECs. For example, a router can receive data packets having a first destination IP address and thus belonging to a first FEC and can receive data packets having a second destination IP address, different than the first destination IP address, and thus belonging to a second FEC. As another example, a router can receive data packets all having the same destination IP address and thus all belonging to the same FEC. Data packets having the same destination IP address might reach its destination via a number of different paths (as opposed to only a single path).

Software forwarding table 20 may list currently available next hop network devices for each FEC or for each group of data packets having the same destination IP address. Each list of currently available next hop network devices for a given FEC or destination address (and thus having the same destination prefix) can thus sometimes be referred to as a software FEC forwarding table 20. Software forwarding table 20 may list next hop devices for multiple FECs or for multiple destination prefixes (i.e., device 10 can store a single software forwarding table 20 separately listing next hop devices for different groups of FECs).

Packet processor 16 is oftentimes referred to as being part of a data plane or forwarding plane. Packet processor 16 receives incoming data packets via ingress port 15, analyzes the received data packets, processes the data packets in accordance with a network protocol, and forwards (or drops) the data packet accordingly. Data packets received in the data plane may optionally be analyzed in the control plane to handle more complex signaling protocols. Packet processor 16 may generally be configured to partition data packets received at ingress port 15 into groups of packets based on their destination address (e.g., to assign incoming packets to one or more FECs) and to choose a next hop device for each data packet when exiting egress port 17.

The choice of next hop device for each data packet occurs through a hashing process over the packet header fields, the result of which is used to select from among a list of next hop devices in the hardware forwarding table 22. Hardware forwarding table 22 may list actual next hop network devices that are currently programmed on network device 10 for each FEC or for each group of data packets having the same destination address. Each list of programmed next hop network devices for a given FEC or destination address can thus sometimes be referred to as a hardware FEC forwarding table 20. Hardware forwarding table 22 is sometimes referred to as a hardware forwarding information base (FIB), a platform FEC forwarding table, or a media access control (MAC) address table. Hardware forwarding table 22 may list actual next hop devices currently programmed for device 10 for multiple FECs or for multiple destination prefixes (i.e., device 10 can store a single hardware forwarding table 22 separately listing programmed next hop devices for different groups of FECs).

In accordance with some embodiments, equal-cost multi-path (ECMP) routing may be used to route data packets from one network device 10 to another. ECMP is a network routing process that allows for traffic of the same session or flow (i.e., traffic between a particular source and destination) to be transmitted across multiple paths of equal cost. ECMP identifies next hop paths (links) of equal cost based on routing metric calculations and hash algorithms (e.g., ECMP identifies a set of routers or hosts each of which is an equal-cost next hop towards the same destination). ECMP can be used with a wide variety of routing protocols because it addresses only the next hop location (e.g., the choice of equal-cost next hop is made independently at each router). Operated in this way, traffic can be load balanced across multiple paths of equal cost while substantially increasing bandwidth between the source and destination by fully utilizing otherwise unused paths to the same destination.

Figure 2:
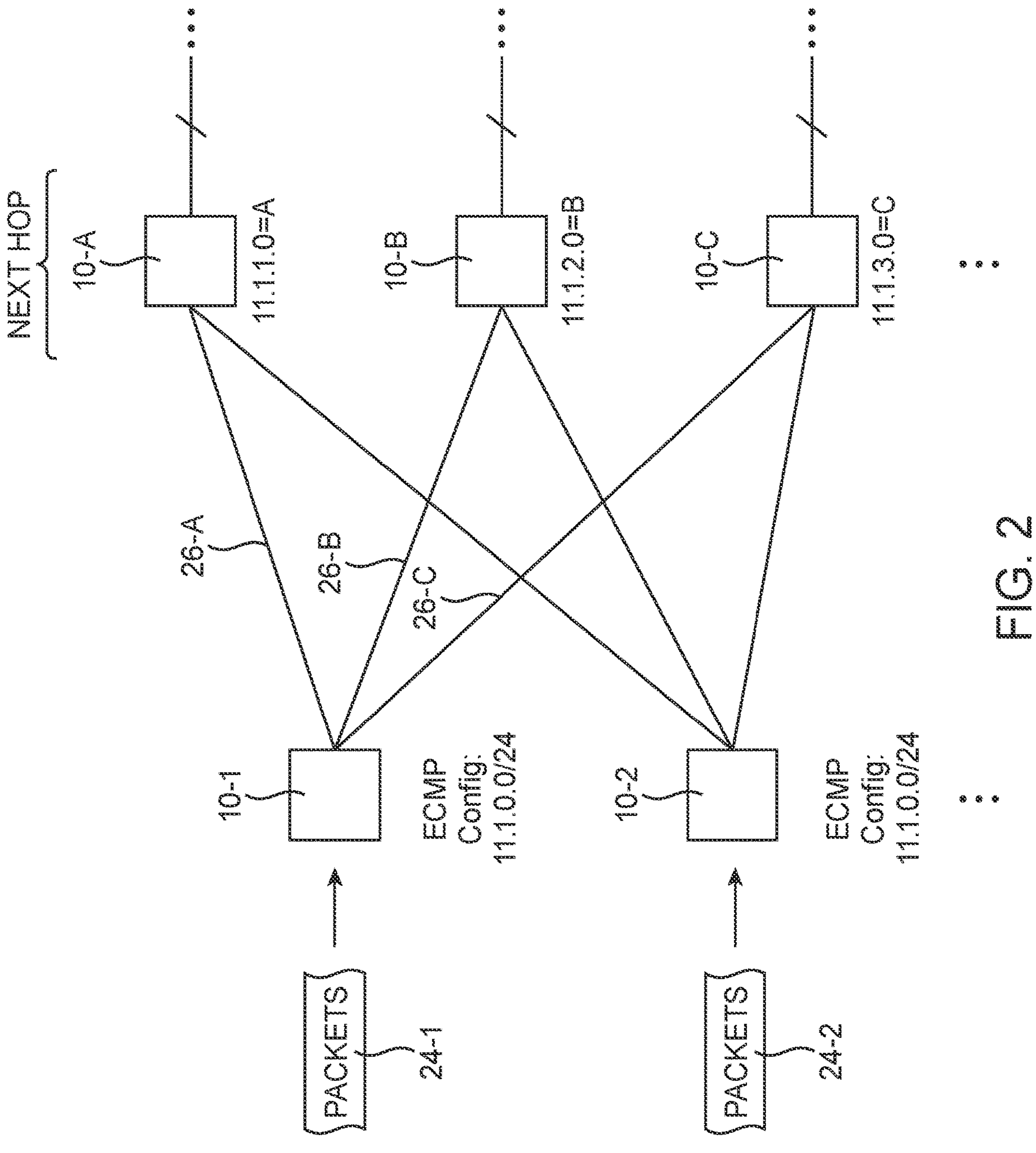
FIG. 2 is a diagram illustrating equal-cost multi-path (ECMP) next hop routes for two parallelly situated network devices configured to route data packets associated with the same forwarding equivalence class (FEC) in accordance with some embodiments.

FIG. 2 is a diagram illustrating equal-cost multi-path (ECMP) next hop routes for two parallel network devices configured to route data packets intended for the same destination (e.g., to route data packets in the same FEC). As shown in FIG. 2, a first network device 10-1 receives data packets 24-1, whereas a second network device 10-2 receives data packets 24-2. Network devices 10-1 and 10-2 may be considered or defined as "parallel" or "parallelly situated" network devices if they are located the same number of hops from the source of the data packets or if they are located the same number of hops from the final destination of the data packets. In the example of FIG. 2, network device 10-1 may use its packet processor 16 to analyze the header fields of data packet(s) 24-1 and identify that packet (s) 24-1 belong to a given ECMP flow or configuration associated with destination prefix "11.1.0.0/24" (as an example). Similarly, network device 10-2 may use its own network processor 16 to analyze the header fields of data packet(s) 24-2 and identify that packets(s) 24-2 belong to an ECMP flow or configuration associated with the same destination prefix "11.1.0.0/24." Since the data packets arriving at parallelly situated network devices 10-1 and 10-2 have the same destination prefix, the data packets should have the same or similar forwarding treatment and arrive at the same destination device (or host). In other words, packets 24-1 and 24-2 can be referred to as being part of the same FEC.

Illustrative routing operations in which ECMP is used are sometimes described herein as an example. In the example of FIG. 2, network device 10-1 is shown to be connected to a first next hop device 10-A, to a second next hop device 10-B, and to a third next hop device 10-C. Next hop device 10-A may have a first IP address "11.1.1.0", sometimes abbreviated herein as "A." Next hop device 10-B may have a second IP address "11.1.2.0", sometimes abbreviated herein as "B." Next hop device 10-C may have a third IP address "11.1.3.0", sometimes abbreviated herein as "C." Next hop devices A, B, and C may generally represent hosts, servers, routers, switches, or other networking elements.

For example, network device 10-1 may be connected to next hop device A via a 100 Mbps link 26A, to next hop device B via another 100 Mbps link 26B, and to next hop device C via yet another 100 Mbps link 26C. Since the speed (cost) of links 26A-26C are all identical, these paths to next hop devices A-C are said to belong to the same ECMP set or ECMP group. Paths of equal cost have the same preference and metric values and the same cost to the network. Similarly, network device 10-2 that is parallel with device 10-1 is also shown to be connected to next hop device A, to next hop device B, and to next hop device C. The links connecting network device 10-2 to the next hop devices A-C also have the same cost. The example of FIG. 2 in which network device 10-1 is connected to three next hop devices A, B, and C of equal cost is merely illustrative. In general, a network device 10 can be simultaneously operable with two or more ECMP routes, three or more ECMP routes, four or more ECMP routes, five or more ECMP routes, 5-10 ECMP routes, or more than 10 ECMP routes.

Figure 3:
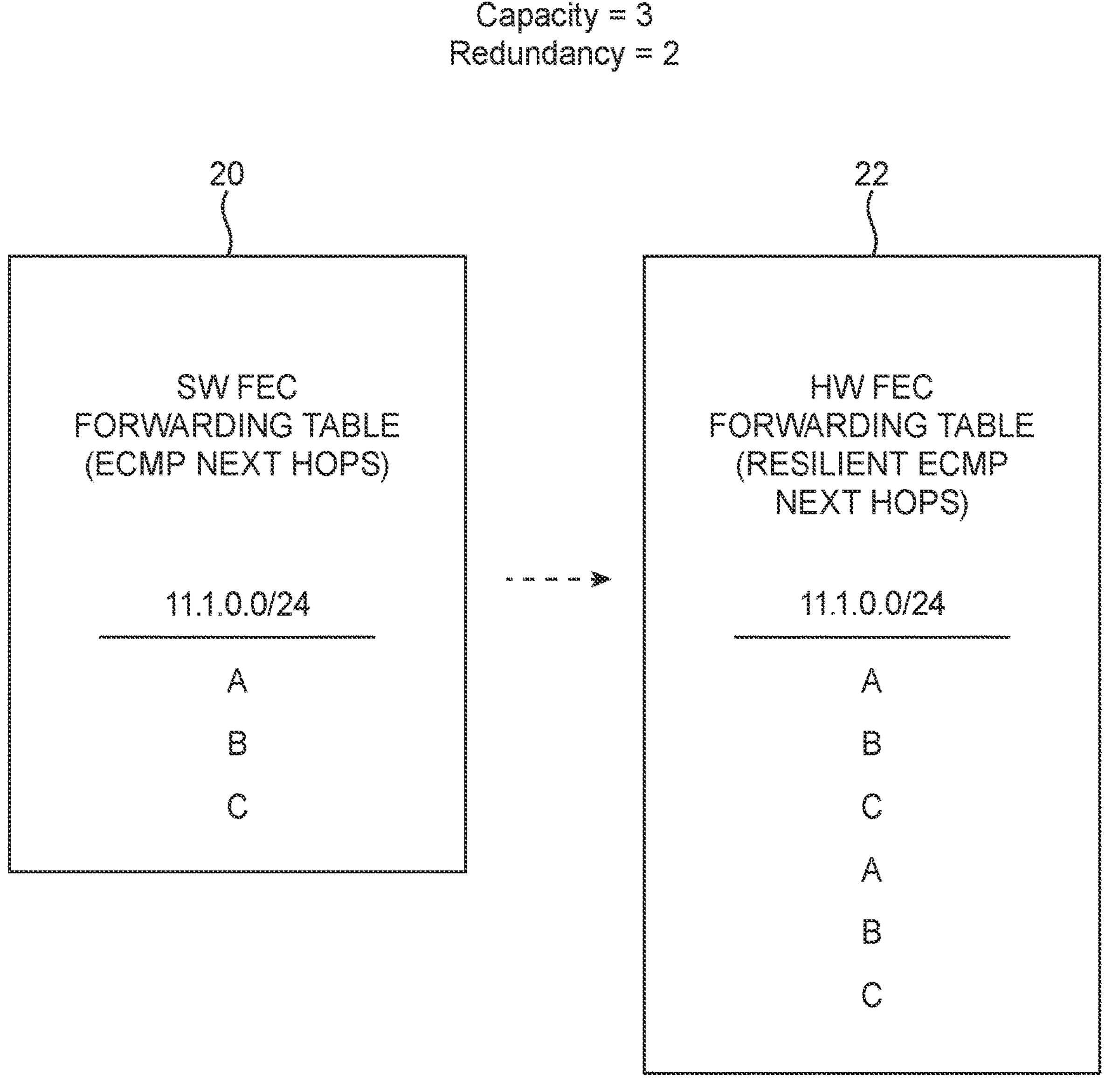
FIG. 3 is a diagram of an illustrative software forwarding equivalence class (FEC) forwarding table and an illustrative hardware forwarding equivalence class (FEC) forwarding table associated with the same network prefix in accordance with some embodiments.

FIG. 3 is a diagram of an illustrative software FEC forwarding table 20 and an illustrative hardware FEC forwarding table 22 associated with the same exemplary network/destination prefix "11.1.0.0/24" (e.g., the lists of FIG. 3 show next hops associated with one FEC). In general, forwarding tables 20 and 22 may also include other next hop lists associated with other destination prefixes or FECs.

As shown in FIG. 3, software FEC forwarding table 20 stored on a network device 10 may list currently available next hop devices A, B, and C with equal routing cost for the given network prefix "11.1.0.0/24", which is consistent with the network setup shown in the example of FIG. 2. The set of available next hop devices of equal cost is sometimes referred to as an ECMP set or ECMP group. An ECMP set of next hops is sometimes referred to as an adjacency group. Each network device 10 may be configured with a predetermined multi-path capacity that limits the maximum number of ECMP routes that can be connected to a network device 10 at any given time. In the example of FIG. 3, the configured capacity is shown as being equal to "3." Since the software FEC forwarding table 20 presently lists three next hop devices A, B, and C, network device 10 will not be allowed to establish an equal-cost link with another next hop device until at least one of the links with A, B, or C goes down (becomes disconnected).

In practice, traffic flow in the same session between a source and a destination can be disrupted as a route undergoes churn, such as when a next hop device is added or deleted as it becomes active or inactive. To minimize such disruption to traffic flow, a routing technique sometimes referred to as flow resilient equal-cost multi-path (FRECMP) routing may be used. FRECMP is a mechanism of equally distributing (spreading out) a set of equal-cost next hop devices for a given route or destination to minimize the amount of traffic flow disruptions.

To support FRECMP, hardware FEC forwarding table 22 is set to a fixed size that is equal to a multiple of the configured capacity. This multiple is sometimes referred to as the redundancy factor or resiliency factor. In other words, table 22 should have a fixed (predetermined) size that is equal to the product of the maximum number of ECMP paths supported by network device 10 and the redundancy factor. The set of FRECMP next hops listed in table 22 is sometimes referred to as a resilient adjacency group.

In the example of FIG. 3, hardware forwarding table 22 may list next hops ABCABC in that order. Data packets associated with this particular FEC table (e.g., data packets having destination prefix 11.1.0.0/24) may be hashed to one of these six next hop slots and forwarded to the next hop in the slot to which they are hashed. Choice of the next hop for each data packet can occur through hashing over the packet header fields. As an example, a modulo-N hashing method can be used. For instance, packet header fields including the source IP address and the destination IP address can be hashed and a modulo-N function can be applied to the hash result (where N is equal to the total number of next hops currently listed in hardware FEC forwarding table 22). In the example of FIG. 3, N is currently equal to six, and the redundancy factor is equal to two. This modulo-N hash method is merely illustrative. If desired, other hashing methods such as a hash-threshold method, a highest random weight (HRW) hash method, or other hashing methods can be used to select the next hop device from the hardware forwarding table.

Flow resilience (or redundancy) is useful when a next hop device gets added to or removed from an ECMP set. In the example of FIG. 3, if next hop device B goes down (gets disconnected), the vacancy left by B can be filled by either A or C so that hardware FEC forwarding table 22 will be updated to list AACACC or ACCAAC in that order. In either scenario, FRECMP can ensure that traffic will still be evenly distributed between next hop devices A and C (e.g., the total number of A slots is still equal to the total number of C slots) without disturbing any existing traffic flows since slots 1, 3, 4, and 6 in table 22 remain unchanged.

In contrast, consider another scenario where the hardware FEC forwarding table only has a fixed size of three without implementing any redundancy/resiliency. In a non-resilient ECMP routing scheme, the number of next hops and hence of the hash modulo result may change when a next hop device is added or removed, hence affecting all network traffic flows in that ECMP set. For instance, the hardware FEC forwarding table might initially list ABC in that order. In this non-resilient scenario, if next hop device B goes down (gets disconnected), the vacancy left by B will be filled by either A or C so that hardware FEC forwarding table 22 will be updated to list AAC or ACC in that order. In either of these scenarios, traffic will no longer be evenly distributed between next hop devices A and C since the total number of A slots is no longer equal to the total number of C slots. FRECMP can therefore ensure equal path distribution among remaining next hop devices even as next hop devices come online or go offline without disturbing existing traffic flows.

The example of FIG. 3 in which the configured capacity is equal to three and the redundancy factor is equal to two is merely illustrative. If desired, the configured ECMP capacity can be set to two or more, three or more, four or more, five or more, 2-10, 10-20, 20-50, 50-100, or more than 100. In other embodiments, the redundancy factor can be set equal to at least two, at least three, at least four, at least five, 2-5, 5-10, or more than 10.

FRECMP by itself, however, cannot guarantee deterministic and consistent ordering across two parallelly situated network devices. "Deterministic" routing can be defined as producing the same (predictable) flow of traffic at a given device if using the same network configuration. "Consistent" routing can be defined as producing the same flow of traffic between multiple network devices with the same network configuration. If care is not taken, the inconsistent ordering oftentimes resulting from FRECMP can be exacerbated by multiple identical routes on different network devices having different ordering for the next hops (i.e., the hardware forwarding table for two parallelly situated networking devices associated with the same FEC or destination prefix might be mismatched).

Figure 4:
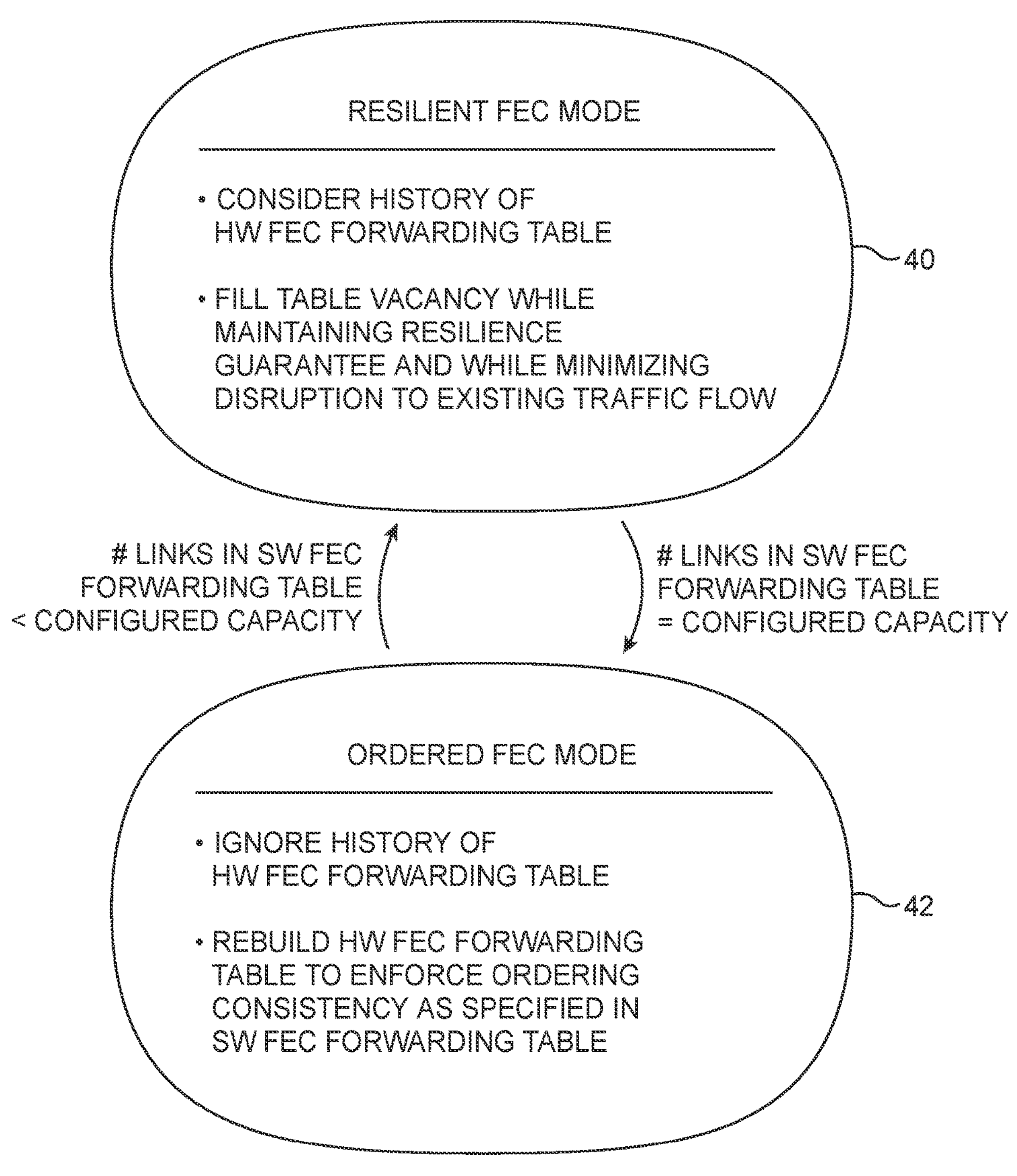
FIG. 4 is a diagram showing how a network device can update its hardware FEC forwarding table in accordance with a resilient mode and an ordered mode in accordance with some embodiments.

In accordance with an embodiment, the routing of data packets having the same destination address (e.g., data packets belonging to the same FEC) may be determined based on a resilient FEC mode and an ordered FEC mode. FIG. 4 is a diagram showing how network device 10 can update its hardware FEC forwarding table in accordance with a first forwarding table handling mode such as resilient mode 40 and a second forwarding table handling mode such as ordered mode 42. Data packets associated with different FECs can be routed using different forwarding table handling modes (e.g., modes 40 and 42 is FEC specific), so modes 40 and 42 are sometimes referred to as a resilient FEC mode and an ordered FEC mode, respectively. For instance, even on a single router 10, data packets associated with a first FEC or destination prefix can be routed in accordance with resilient FEC mode 40, whereas data packets associated with a second FEC or destination prefix different than the first FEC can be routed in accordance with ordered FEC mode 42. As another example, data packets in different FECs can be routed in accordance with the resilient FEC mode 40. As another example, data packets in different FECs can be routed in accordance with the ordered FEC mode 42.

As shown in FIG. 4, operation in resilient mode 40 may involve considering history information associated with the fixed-size hardware FEC forwarding table (e.g., by keeping a historical record of prior or previous state of each next hop slot in the hardware FIB to minimize the number of necessary changes made to that FIB when a next hop is added or removed). Recently vacant slots in the hardware forwarding table can be filled using any remaining next hop device while ensuring equal distribution of traffic, whereas slots occupied by incumbent next hop devices should not be altered. In other words, the packet processor or other processing circuitry may fill a vacancy in the hardware forwarding table when an existing next hop device gets disconnected while maintaining flow resiliency and while minimizing disruption to any existing traffic flows. Resilient mode 40, like FRECMP, provides the least perturbation to the prior states while ensuring the least amount of rehashing. Resilient mode 40 can therefore sometimes be referred to as an FRECMP mode.

Ordered mode 42 can be used to provide consistent and deterministic traffic distribution among an ECMP set. Operation in ordered mode 42 may involve ignoring the history information associated with the hardware FEC forwarding table (e.g., by disregarding the flow resilient historical record of the prior or previous state of each next hop slot in the hardware FIB). Whenever an existing next hop device goes offline (gets disconnected) or whenever a next hop device comes online (gets connected or reestablished), the entire hardware forwarding table can be reordered or updated to enforce or implement a next hop ordering that is consistent with a sorted order of next hops specified in the corresponding software FEC forwarding table. While ordered mode 42 might disrupt existing traffic flows, it can help maintain the original order or ensure a consistent ordering of next hop devices in the hardware FEC forwarding tables across two or more parallelly situated network devices 10. Ordered mode 42 can therefore sometimes be referred to as a consistent next hop ordering mode.

Network device 10 may update or program its hardware FEC forwarding table 22 using resilient mode 40 whenever the number of paths/links currently listed in software FEC forwarding table 20 is less than the configured ECMP capacity (e.g., when the software FEC table is below the preconfigured capacity). In the example of FIG. 3 where the configured capacity is equal to three, hardware FEC forwarding table 22 may be updated in accordance with resilient mode 40 as long as network device 10 is currently connected to less than three ECMP next hop devices for the given destination prefix.

Network device 10 may update or program its hardware FEC forwarding table 22 using ordered mode 42 whenever the number of paths/links currently listed in software FEC forwarding table 20 is equal to the configured ECMP capacity. In the example of FIG. 3 where the configured capacity is equal to three, hardware FEC forwarding table 22 may be updated in accordance with ordered mode 42 as long as network device 10 is currently connected to three ECMP next hop devices for the given destination prefix. This condition in which the number of paths in the software forwarding table is equal to the configured capacity for a particular destination prefix is defined herein as being in "steady state."

Thus, when the software FEC forwarding table is in steady state, the corresponding hardware FEC forwarding table may be updated in accordance with ordered mode 42 to ensure both consistent and deterministic traffic flow. When the software FEC forwarding table is not in steady state, the corresponding hardware FEC forwarding table may be updated in accordance with resilient mode 40 to ensure flow resiliency (e.g., to ensure even distribution of traffic across remaining next hop devices while minimizing disruptions to existing flows). Configured and operated in this way, consistent and deterministic traffic distribution and flow can be achieved during ordered mode 42 while minimal traffic flow disruptions can be achieved when a route undergoes churn (i.e., when a next hop device gets added or deleted) during resilient (FRECMP) mode 40.

This example in which the network devices switches between the resilient mode and the ordered mode based on whether the software forwarding table is in steady state or at capacity is merely illustrative and is not intended to limit the scope of the present embodiments. If desired, the determination of whether to update the hardware forwarding table using one mode or another can depend on one or more user-defined criteria, one or more predetermined criteria, or any suitable criteria. The criteria for switching modes for one network device can differ from or can be the same as the criteria for switching modes for another device.

Figure 5:
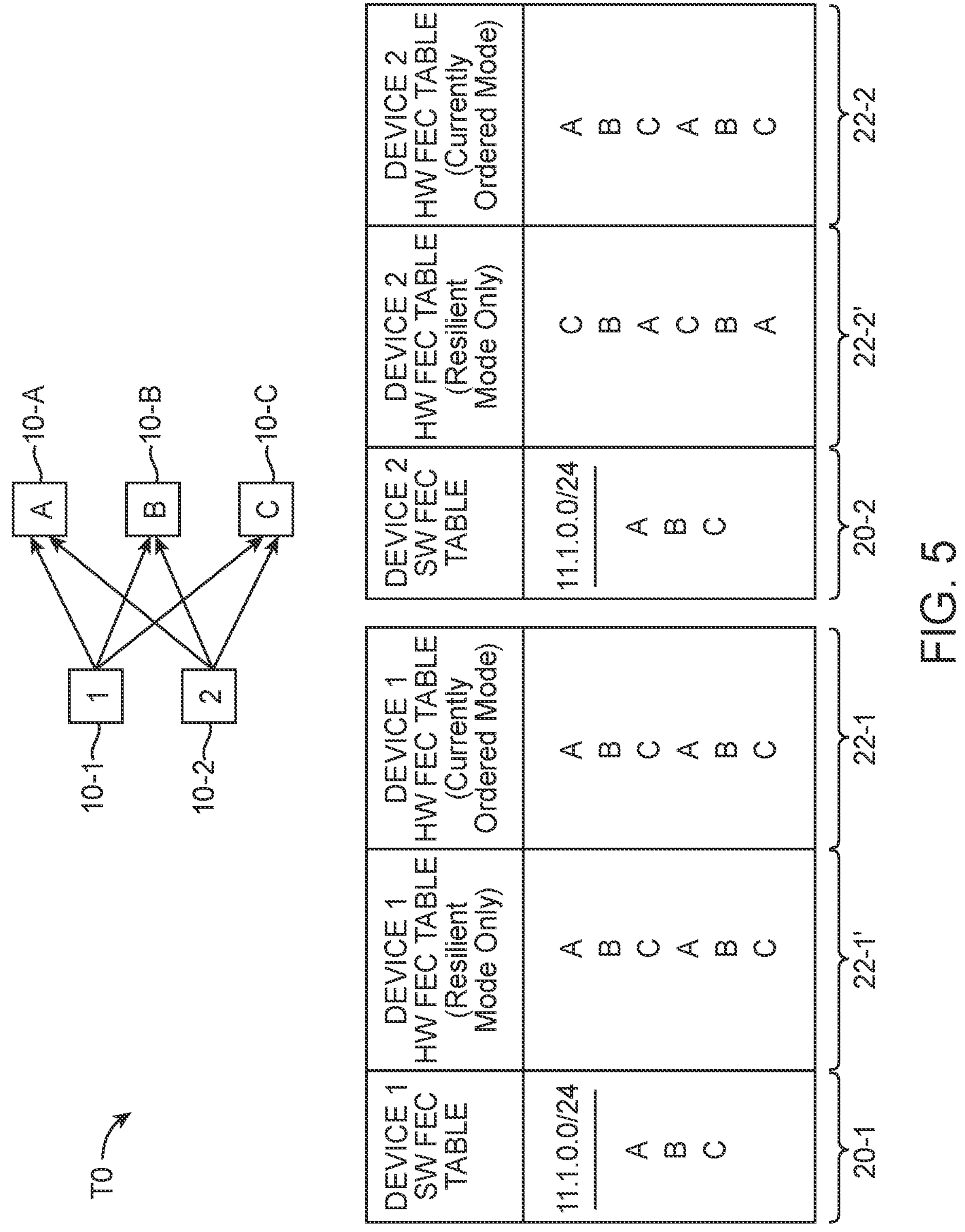
FIG. 5 is a diagram illustrating how two network devices with different initial states can be reconfigured to have the same hardware FEC forwarding table using an ordered mode in accordance with some embodiments.

FIGS. 5 and 6 show examples illustrating benefits associated with operating a network device 10 using both resilient mode 40 and ordered mode 42. FIG. 5 illustrates a scenario in which the starting positions of the hardware FEC forwarding tables between two parallelly situated networking devices are initially different. As shown in the snapshot of FIG. 5 at initial time T0, network device 10-1 may be connected to ECMP next hops A, B and C while network device 10-2 that is parallelly situated with respect to network device 10-1 may also be connected to ECMP next hops A, B, and C.

Table 20-1 represents the software forwarding table associated with a given destination prefix (e.g., 11.1.0.0/24) or a given multi-path FEC for first network device 10-1. Table 22-1' represents the corresponding hardware forwarding table that is maintained using a conventional table maintenance scheme that uses only FRECMP for network device 10-1. Table 22-1 represents the corresponding hardware forwarding table that is maintained using resilient mode when table 20-1 is not at steady state (e.g., when the software forwarding table is not at capacity or below capacity) and that is reordered using ordered mode 42 when table 20-1 is at steady state for first network device 10-1.

On the other hand, table 20-2 represents the software forwarding table associated with the same destination prefix (e.g., 11.1.0.0/24) or the same multi-path FEC for second network device Table 22-2' represents the corresponding hardware forwarding table that is maintained using a conventional approach that uses only FRECMP for network device 10-2. Table 22-2 represents the corresponding hardware forwarding table that is maintained using resilient mode when table 20-2 is not at steady state and that is reordered using ordered mode 42 when table is at steady state for second network device 10-2. The benefits of switching between modes 40 and 42 as opposed to a strict FRECMP only scheme can therefore be seen by comparing the behavior of tables 22-1 and 22-2 with the behavior of tables 22-1' and 22-2', respectively.

In the example of FIG. 5, assuming the configured capacity is equal to three, both software forwarding tables 20-1 and 20-2 associated with the same destination prefix (or FEC) are at capacity since they both list three next hop devices ABC in that order. Even when tables 20-1 and 20-2 are identical, however, tables 22-1' and 22-2' can be different. For instance, table 22-1' may list next hops ABCABC in that initial order, whereas table 22-2' may list next hops CBACBA in that initial order. While both tables 22-1' and 22-2' maintain resiliency by providing equal distribution of traffic among next hop devices A, B, and C, the ordering and thus hash results would be different between the two devices. In this case, hardware forwarding tables 22-1' and 22-2' will not match regardless of churn.

Since software forwarding tables 20-1 and 20-2 associated with the same destination prefix are at capacity, hardware forwarding tables 22-1 and 22-2 should be updated in accordance with ordered mode 42. In the ordered mode 42, the hardware forwarding table may be reordered to enforce or administer an ordering that is consistent with the order specified in the software forwarding table while ignoring any historical record of the hardware forwarding table (see, e.g., FIG. 4). As a result, hardware forwarding tables 22-1 and 22-2 updated using the ordered mode 42 will produce the same next hops list ABCABC in that sorted order. In other words, updating hardware forwarding tables 22-1 and 22-2 in accordance with the ordered mode 42 when the software forwarding tables are at capacity will ensure that the initial next hop ordering is the same across two parallelly situated network devices 10-1 and 10-2.

Figure 6A:
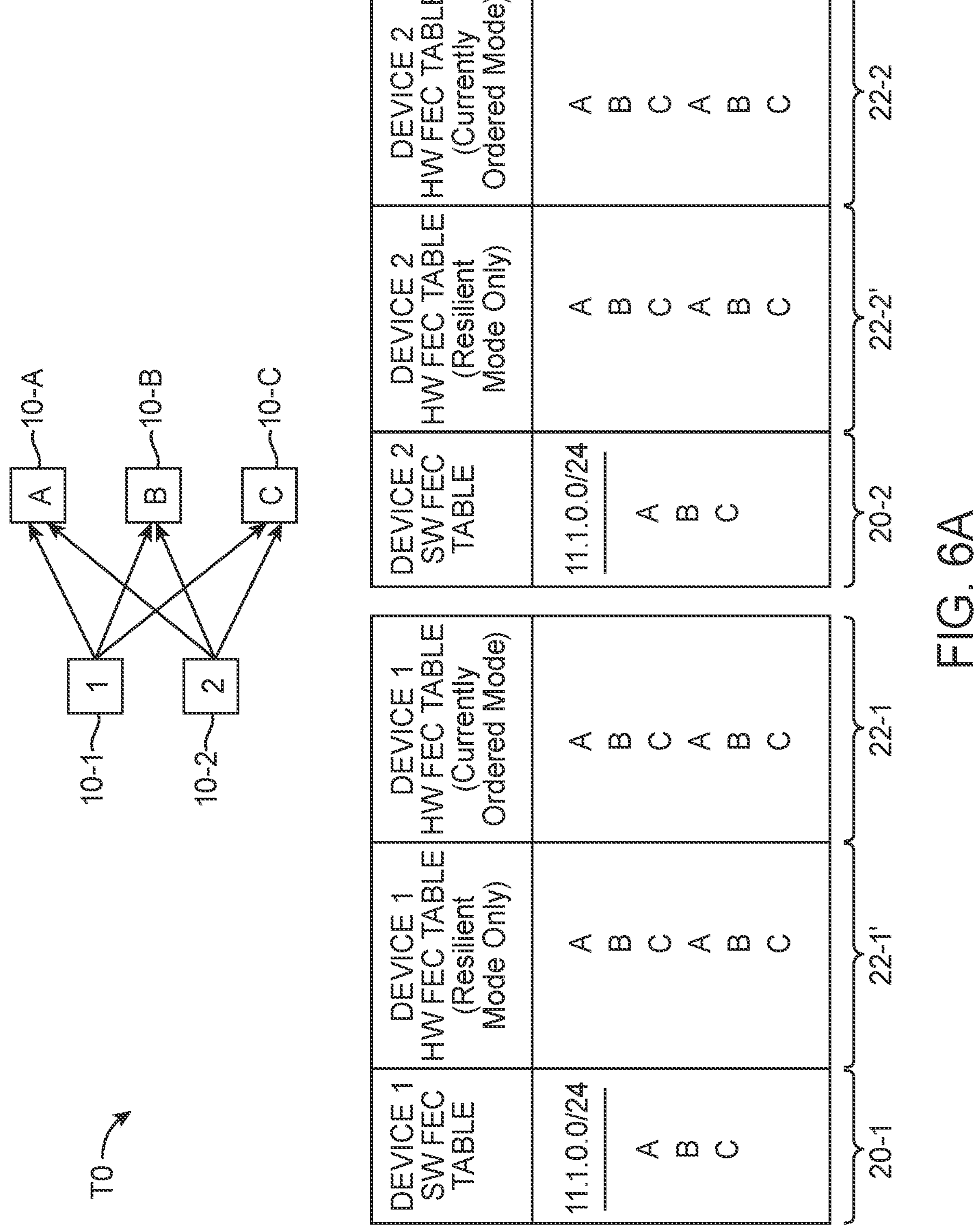
FIG. 6A is a diagram illustrating forwarding tables of first and second network devices with the same initial state being connected to next hop devices A, B, and C in accordance with some embodiments.

The example of FIG. 5 in which the starting positions of the hardware FEC forwarding tables (prior to reordering) between two parallelly situated networking devices are initially different is merely illustrative. FIG. 6A illustrates another scenario in which the starting positions of the hardware FEC forwarding tables are initially the same. As shown in the snapshot of FIG. 6A at initial time T0, network device 10-1 may be connected to ECMP next hops A, B and C while network device 10-2 that is parallelly situated with respect to network device 10-1 is also connected to ECMP next hops A, B, and C. All of tables 20-1, 22-1', and 22-1 associated with network device 10-1 and all of tables 20-2, 22-2', and 22-2 associated with network device 10-2 are for data packets with the same destination prefix (e.g., 11.1.0.0/24) and can thus all be assigned to the same multi-path FEC. In the example of FIG. 6A, the software FEC forwarding tables are at capacity and the hardware FEC forward tables are all identical (e.g., tables 22-1' and 22-2' are matching, and tables 22-1 and 22-2 are also matching).

Figure 6B:
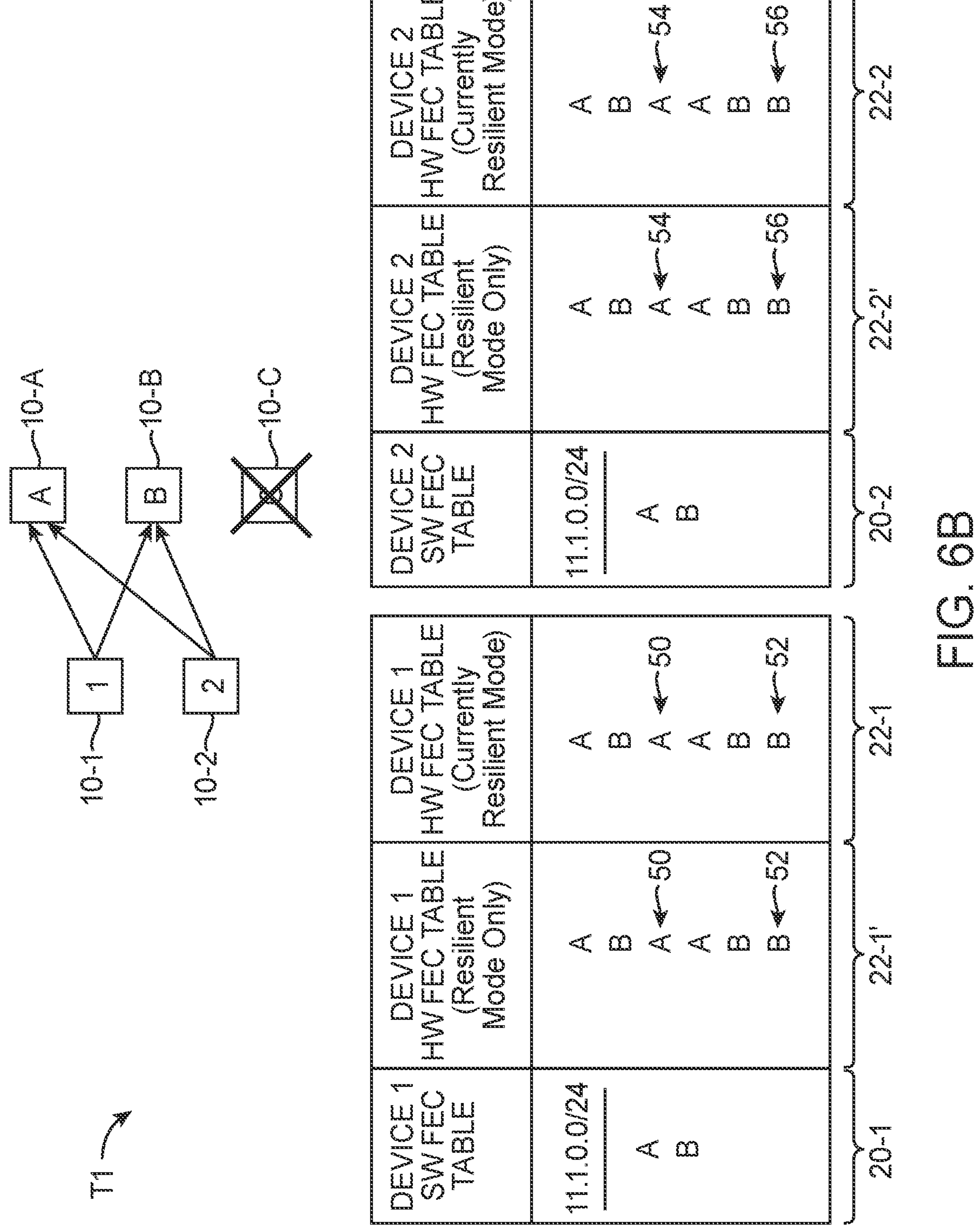
FIG. 6B is a diagram illustrating how the forwarding tables of the first and second network devices can be updated when a link to next hop device C is disconnected in accordance with some embodiments.

FIG. 6B shows a subsequent snapshot at time T1 following time T0 when next hop device C goes down (e.g., when the links between next hop device 10-C to both parallel network devices 10-1 and 10-2 get disconnected). When this occurs, the software forwarding tables for both devices 10-1 and 10-2 will be updated to reflect the removal of C (e.g., tables 20-1 and 20-2 will now list only two next hops A and B). Assuming that the configured capacity is equal to three, the software FEC tables would no longer be at steady state (since two is less than three). As a result, tables 22-1 and 22-2 will both be updated using resilient mode 40. Since tables 22-1' and 22-2' are only updated using FRECMP, tables 22-1' and 22-1 will be updated in the same way for network device 10-1 while tables 22-2' and 22-2 will be updated in the same way for network device 10-2.

As shown in FIG. 6B, tables 22-1' and 22-1 on network device 10-1 will fill the vacancies left by C by filling the third slot with A (see arrows 50) and by filling the sixth slot with B (see arrows 52). Similarly, tables 22-2' and 22-2 on network device 10-2 will fill the vacancies left by C by filling the third slot with A (see arrows 54) and by filling the sixth slot with B (see arrows 56). Operated in this way, the hardware FEC forwarding tables can maintain resiliency (e.g., by evenly distributing traffic flows between remaining next hops A and B) without disturbing any existing slots (e.g., by considering the historical record of the prior state of each slot and preserving the prior state if the incumbent next hop is still present).

Figure 6C:
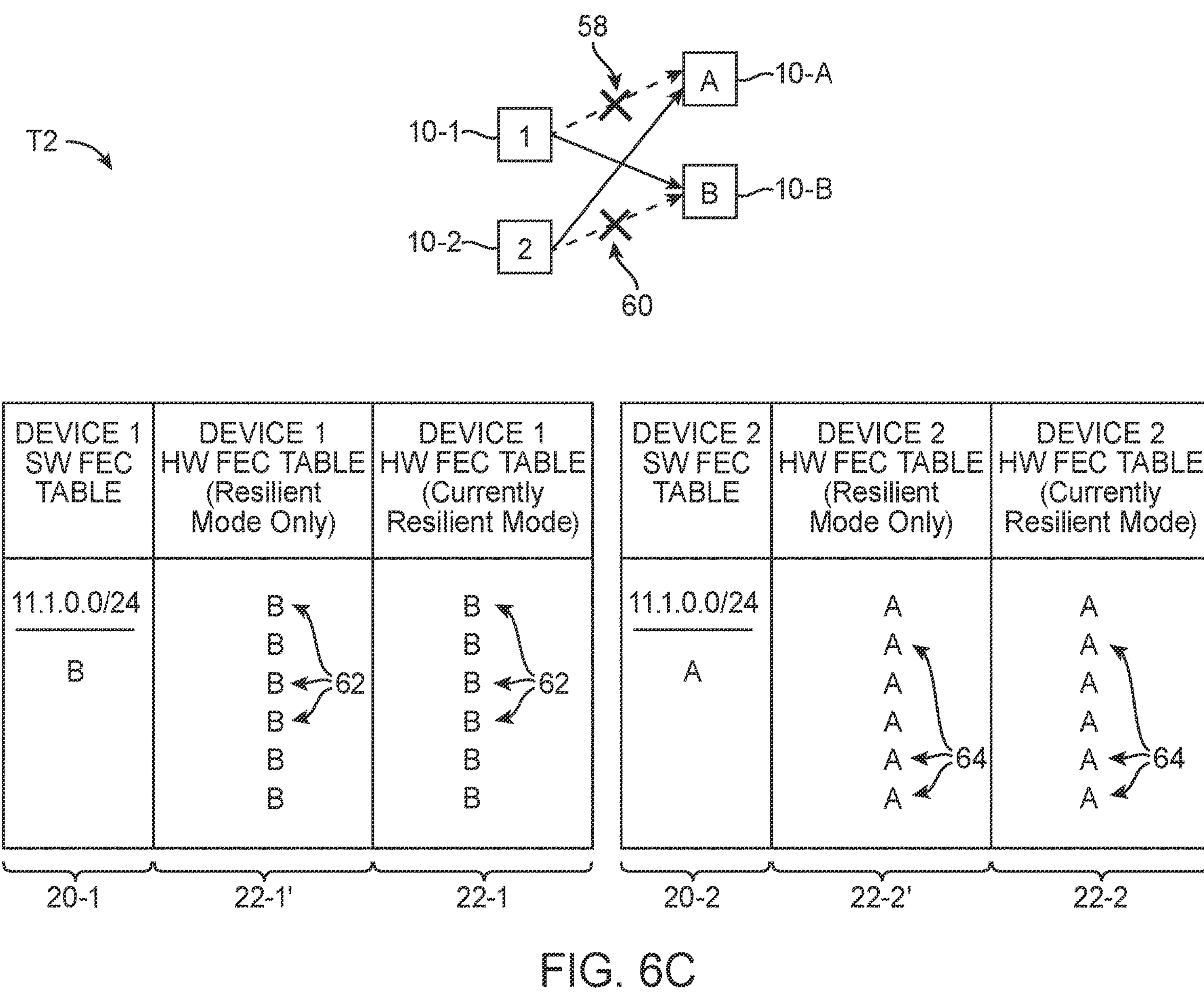
FIG. 6C is a diagram illustrating how the forwarding tables of the first and second network devices can be updated when a link between the first network device and device A goes down and when a link between the second network device and device B goes down in accordance with some embodiments.

FIG. 6C shows a subsequent snapshot at time T2 following time T1 when the link between network device 10-1 and next hop device A goes down (as shown by disconnection 58) and when the link between network device 10-2 and next hop device B goes down (as shown by disconnection 60). When this occurs, the software forwarding table for device 10-1 will be updated to reflect the removal of A (e.g., table 20-1 will now list only next hop B), whereas the software forwarding table for device 10-2 will be updated to reflect the removal of B (e.g., table 20-2 will now list only next hop A). Assuming that the configured capacity is equal to three, the software forwarding tables are still not at steady state (since one is less than three). As a result, tables 22-1 and 22-2 will both be updated using resilient mode 40. Since tables 22-1' and 22-2' are only updated using FRECMP, tables 22-1' and 22-1 will be updated in the same way for network device 10-1 while tables 22-2' and 22-2 will be updated in the same way for network device 10-2.

As shown in FIG. 6C, tables 22-1' and 22-1 on network device 10-1 will fill the vacancies left by A by filling the first, third, and fourth slots with the only remaining next hop B (see arrows 62). Similarly, tables 22-2' and 22-2 on network device 10-2 will fill the vacancies left by B by filling the second, fifth, and sixth slots with the only remaining next hop A (see arrows 64). Operated in this way, all slots of hardware FEC forwarding table 22-1 for network device 10-1 will be serviced by next hop B, whereas all slots of hardware FEC forwarding table 22-2 for network device 10-2 will be serviced by next hop A.

Figure 6D:
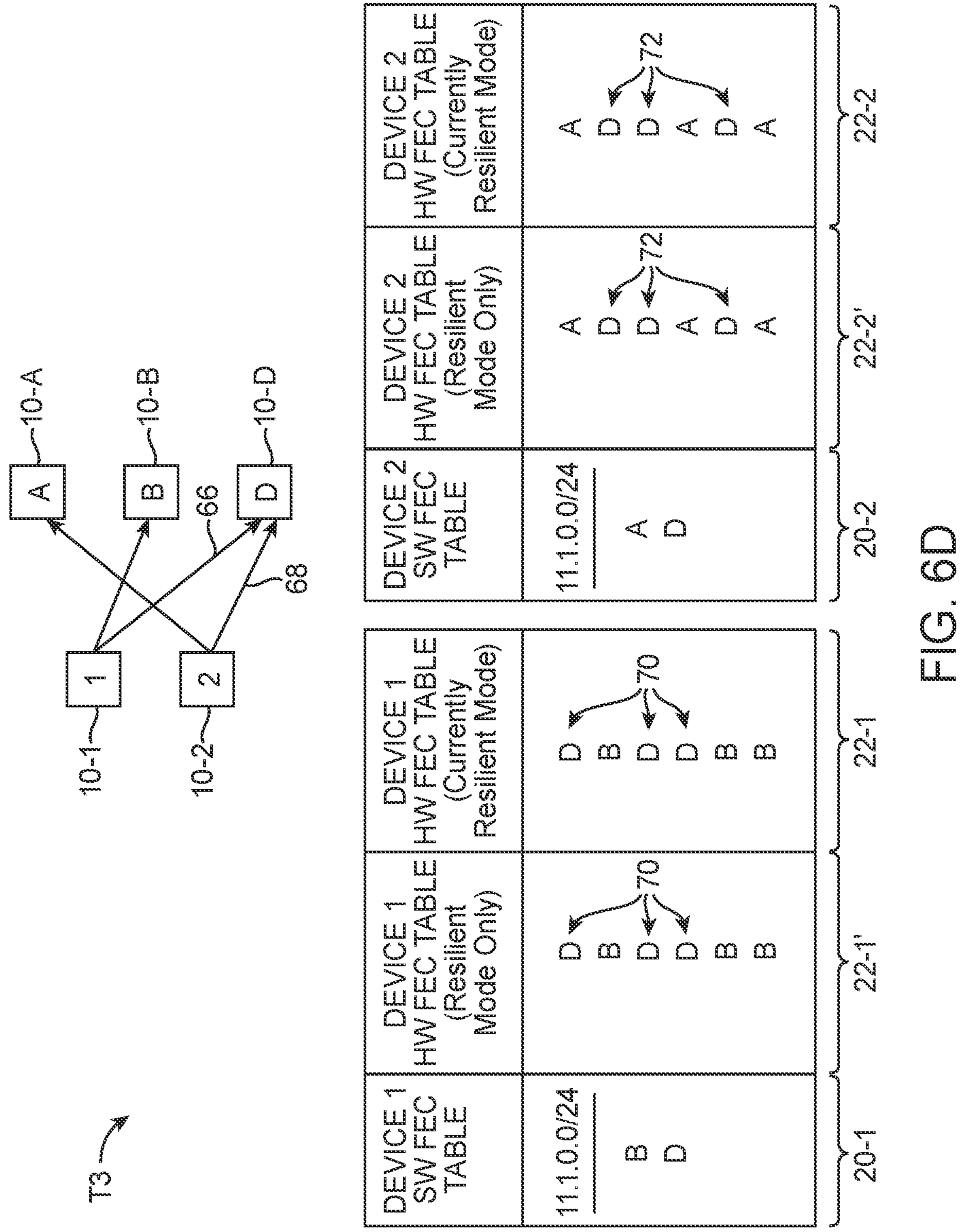
FIG. 6D is a diagram illustrating how the forwarding tables of the first and second network devices can be updated when the first and second network devices are each connected with a new next hop device D in accordance with some embodiments.

FIG. 6D shows a subsequent snapshot at time T3 following time T2 when a new next hop device D comes online to replace the previously removed next hop C. Network device 10-1 may establish a new connection with next hop D (as shown by link 66), whereas network device 10-2 establishes a new connection with next hop D (as shown by link 68). When this occurs, the software forwarding tables for network devices 10-1 and 10-2 will both be updated to reflect the addition of D (e.g., table 20-1 will now list next hops B and D, whereas table 20-2 will now list next hops A and D). Assuming that the configured capacity is equal to three, the software forwarding tables are still not at steady state (since two is less than three). As a result, tables 22-1 and 22-2 will both be updated using resilient mode 40. Since tables 22-1' and 22-2' are only updated using FRECMP, then tables 22-1' and 22-1 will be updated in the same way for network device 10-1 while tables 22-2' and 22-2 will be updated in the same way for network device 10-2.

As shown in FIG. 6D, tables 22-1' and 22-1 on network device 10-1 will replace half of their slots with D while minimizing perturbation to existing traffic flows. Since the historical record of table 22-1 will show that the second and fifth slots have always been filled by B since the beginning at time T0, those slots will be preserved (i.e., not replaced). As a result, tables 22-1' and 22-1 will replace the first, third, and fourth slots with the new next hop D, as shown by arrows 70. Similarly, tables 22-2' and 22-2 on network device 10-2 will replace half of their slots with D while minimizing perturbation to existing traffic flows. Since the historical record of table 22-2 will show that the first and fourth slots have always been filled by A since the beginning at time T0, those slots will be preserved (i.e., unaltered). As a result, tables 22-2' and 22-2 will replace the second, third, and fifth slots with the new next hop D, as shown by arrows 72. Operated in this way, the hardware FEC forwarding tables can maintain resiliency (e.g., by evenly distributing traffic flows between next hops B and D for device 10-1 and by evenly distributing traffic flows between next hops A and D for device 10-2) while minimizing disruption to existing traffic flows.

Figure 6E:
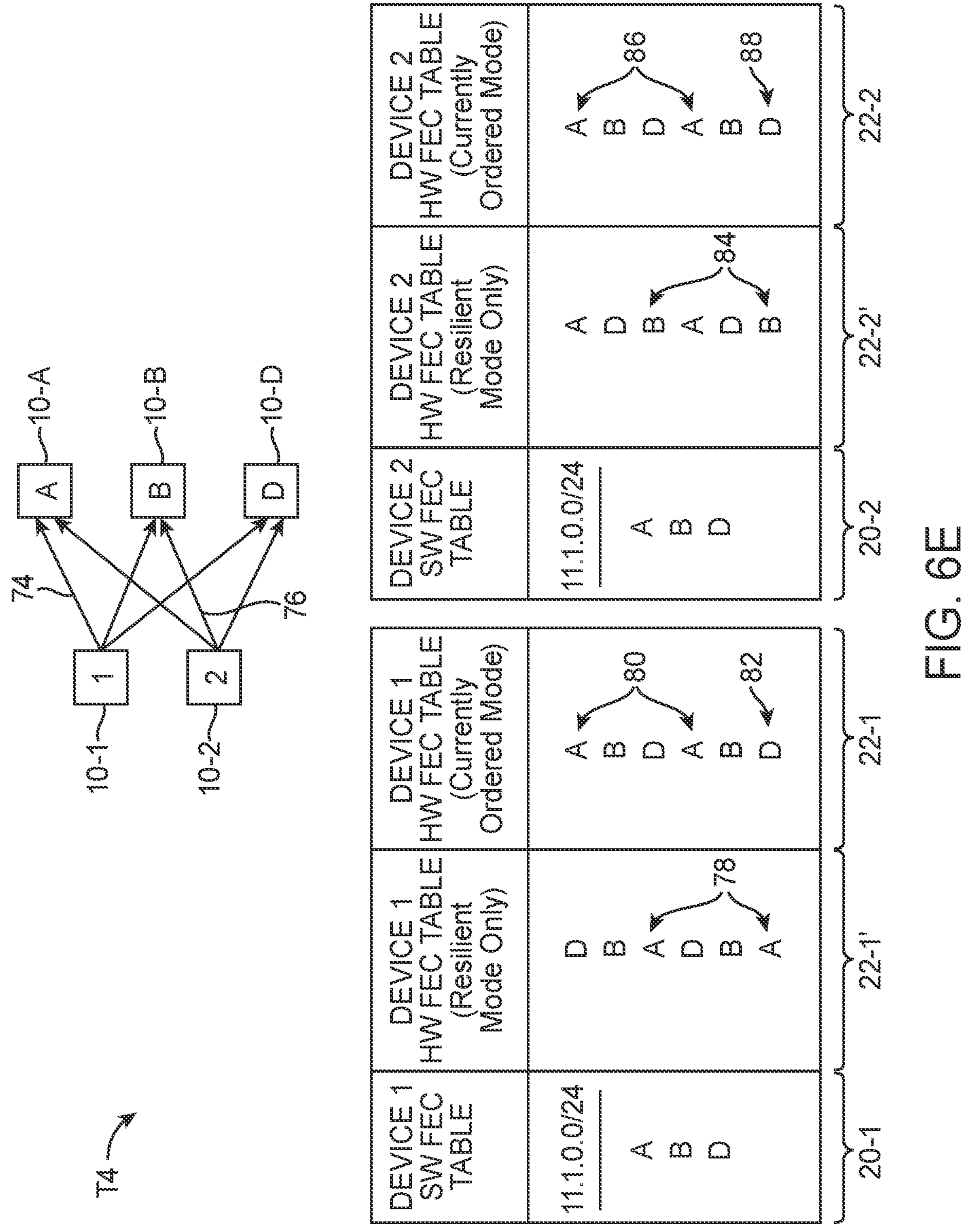
FIG. 6E is a diagram illustrating how the forwarding tables of the first and second network devices can be updated when the link between the first network device and device A is reestablished and when the link between the second network device and device B is reestablished in accordance with some embodiments.

FIG. 6E shows a subsequent snapshot at time T4 following time T3 when the link between network device 10-1 and next hop device A comes back online (as shown by connection 74) and when the link between network device 10-2 and next hop device B comes back (as shown by connection 76). When this occurs, the software forwarding table for device 10-1 will be updated to reflect the addition of A (e.g., table 20-1 will now list next hops ABD in that sorted order), whereas the software forwarding table for device 10-2 will be updated to reflect the addition of B (e.g., table 20-2 will now list next hops ABD in that sorted order). Assuming that the configured capacity is equal to three, the software forwarding tables are now at steady state (since the number of next hops in the software FEC tables is now equal to three). As a result, tables 22-1 and 22-2 will now be updated using ordered mode 42. Since tables 22-1' and 22-2' are only updated using FRECMP, there will now be a difference between tables 22-1' and 22-1 for network device 10-1 and also a difference between 22-2' and 22-2 for network device 10-2.

As shown in FIG. 6E, table 22-1' for network device 10-1 may only replace the third and sixth slots with A (as shown by arrows 78) without disturbing any other slot to minimize disruption to existing traffic flows. In contrast, table 22-1 for network device 10-1 may ignore the historical record (prior states) of table 22-1 and update any of its slots to enforce or apply the sorted next hop ordering specified by software forwarding table 20-1. Here, table 22-1 will replace the first and fourth slots with A (as shown by arrows 80) and replace the sixth slot with D (as shown by arrow 82) to enforce a sorted resilient next hop order ABDABD, which is different than the next hop order of table 22-1'.

Similarly, table 22-2' for network device 10-2 may only replace the third and sixth slots with B (as shown by arrows 84) without disturbing any other slot to minimize disruption to existing traffic flows. In contrast, table 22-2 for network device 10-2 may again ignore the historical record (prior states) of table 22-2 and update any of its slots to enforce the sorted next hop ordering specified by software forwarding table 20-2. Here, table 22-2 will replace the second and fifth slots with B (as shown by arrows 86) and replace the sixth slot with D (as shown by arrow 88) to enforce the sorted resilient next hop ordering ABDABD, which is different than the next hop order of table 22-2'.

Without use of ordered mode 42, the next hop ordering as shown in tables 22-1' and 22-2' between the two parallel network devices 10-1 and 10-2 can be different (e.g., DBADBA is different than ADBADB). With the use of ordered mode 42 when the software forwarding table is at the configured capacity, however, the next hop ordering as shown in tables 22-1 and 22-2 will be the same between the two parallel network devices 10-1 and 10-2 (e.g., both tables 22-1 and 22-2 updated in accordance with the ordered FEC mode will list next hops ABDABD in that sorted order). Thus, as shown in the exemplary sequence of events in FIGS. 6A-6E, the hybrid use of the resilient mode and the ordered mode can help ensure the least amount of traffic flow disruptions during non-steady-state periods while providing deterministic and consistent ordering of the next hops during steady state periods. This can be achieved regardless of upstream and downstream changes for network device 10 while maintaining the least amount of flow disruptions when paths are added or removed, or during link flap events.

Figure 7:
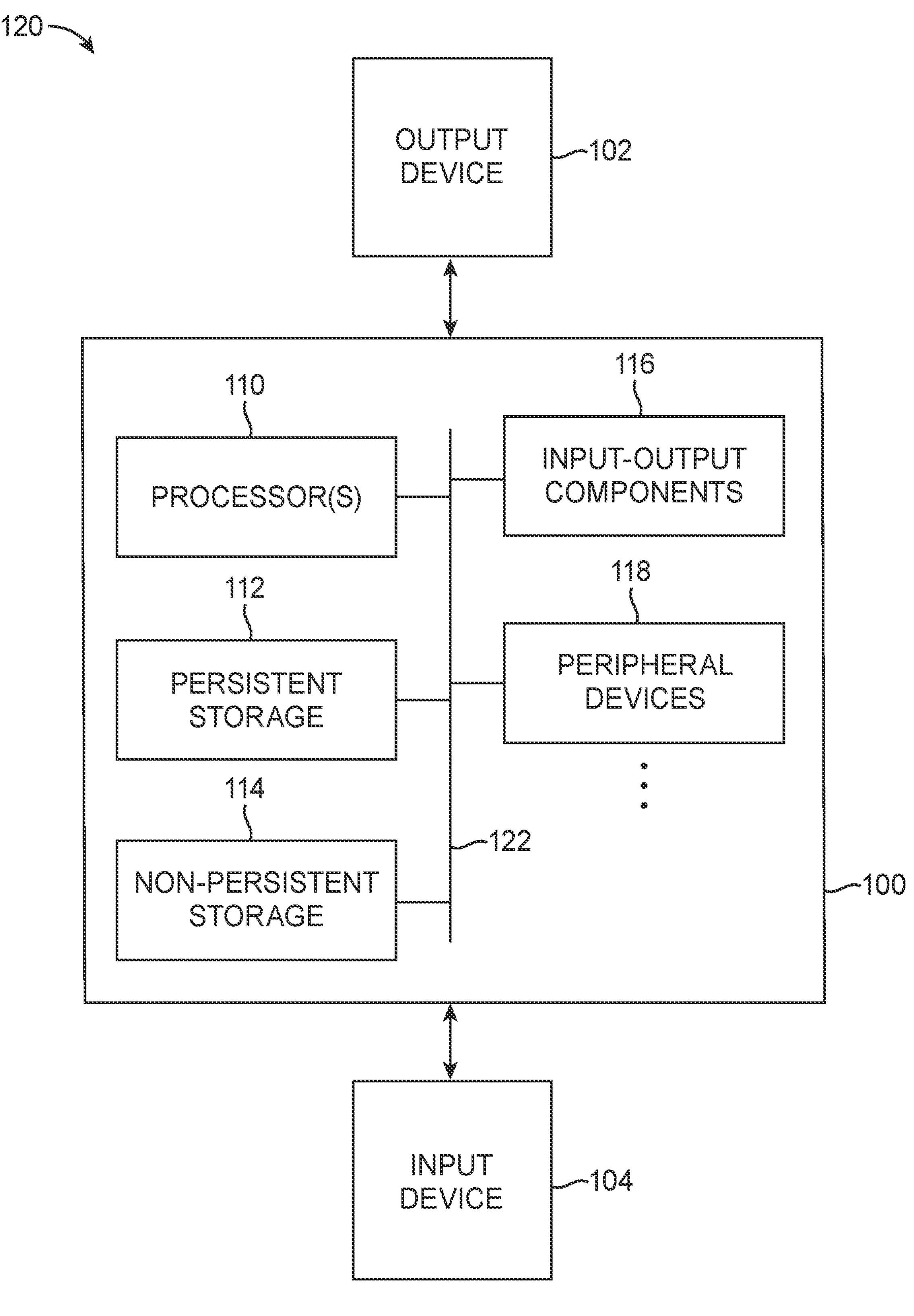
FIG. 7 is a diagram showing illustrative hardware components within a data processing system in accordance with some embodiments.

The foregoing embodiments may be made part of a larger system. FIG. 7 shows a system such as data processing system 120. Data processing system 120 may include a network device 100 optionally coupled to an input device 104 and/or an output device 102. Network device 100 may represent a network device 10 described in connection with the embodiments of FIGS. 1-6. Network device 100 may include one or more processors 110 (e.g., CPU 12 of FIG. 1), storage circuitry such as persistent storage 112 (e.g., flash memory or other electrically-programmable read-only memory configured to form a solid-state drive, a hard disk drive, etc.), non-persistent storage 114 (e.g., volatile memory such as static or dynamic random-access memory, cache memory, etc.), or any suitable type of computer-readable media for storing data, software, program code, or instructions, input-output components 116 (e.g., communication interface components such as a Bluetooth® interface, a Wi-Fi® interface, an Ethernet interface, an optical interface, and/or other networking interfaces for connecting device 100 to the Internet, a local area network, a wide area network, a mobile network, other types of networks, and/or to another network device), peripheral devices 118, and/or other electronic components. These components can be coupled together via a system bus 122.

As an example, network device 100 can be part of a host device that is coupled to one or more output devices 102 and/or to one or more input device 104. Input device(s) 104 may include one or more touchscreens, keyboards, mice, microphones, touchpads, electronic pens, joysticks, buttons, sensors, or any other type of input devices. Output device(s) 106 may include one or more displays, printers, speakers, status indicators, external storage, or any other type of output devices.

System 120 may be part of a digital system or a hybrid system that includes both digital and analog subsystems. System 120 may be used in a wide variety of applications as part of a larger computing system, which may include but is not limited to: a datacenter, a computer networking system, a data networking system, a digital signal processing system, a graphics processing system, a video processing system, a computer vision processing system, a cellular base station, a virtual reality or augmented reality system, a network functions virtualization platform, an artificial neural network, an autonomous driving system, a combination of at least some of these systems, and/or other suitable types of computing systems.

The methods and operations described above in connection with FIGS. 1-7 may be performed by the components of a network device using software, firmware, and/or hardware (e.g., dedicated circuitry or hardware). Software code for performing these operations may be stored on non-transitory computer readable storage media (e.g., tangible computer readable storage media) stored on one or more of the components of the network device. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device (e.g., processor 12 of FIG. 1, processor 110 of FIG. 7, etc.).

The foregoing is merely illustrative and various modifications can be made to the described embodiments. The foregoing embodiments may be implemented individually or in any combination.

What is claimed is:

1. A method of operating a network device coupled to one or more next hop devices, the method comprising:

in response to a link between the network device and the one or more next hop devices being disconnected or established, updating a software forwarding table stored on the network device, wherein the software forwarding table lists next hop devices currently available to the network device for a given destination prefix; and in response to updating the software forwarding table, determining whether to update a hardware forwarding table corresponding to the software forwarding table for the given destination prefix in accordance with a resilient mode or an ordered mode, wherein the resilient mode considers a prior state of the hardware forwarding table to evenly distribute traffic flows, via a plurality of links, to next hop devices listed in the hardware forwarding table, and wherein the ordered mode ignores the prior state of the hardware forwarding table.

2. The method of claim 1, wherein determining whether to update the hardware forwarding table in accordance with the resilient mode or the ordered mode comprises determining whether the updated software forwarding table is at steady state.

3. The method of claim 2, further comprising:

in response to determining that the updated software forwarding table for the given destination prefix is at steady state, updating the hardware forwarding table for the given destination prefix in accordance with the ordered mode.

4. The method of claim 3, further comprising:

in response to determining that the updated software forwarding table for the given destination prefix is not at steady state, updating the hardware forwarding table for the given destination prefix in accordance with the resilient mode.

5. The method of claim 1, wherein the hardware forwarding table has a fixed size that is larger than a size of the software forwarding table.

6. The method of claim 1, wherein determining whether to update the hardware forwarding table in accordance with the resilient mode or the ordered mode comprises determining whether the updated software forwarding table is at a configured capacity and wherein the hardware forwarding table has a fixed size that is equal to a multiple of the configured capacity.

7. The method of claim 1, wherein updating the hardware forwarding table in accordance with the resilient mode comprises updating the hardware forwarding table to minimize disruption to existing traffic flows to a destination address corresponding to the given destination prefix.

8. The method of claim 1, wherein updating the hardware forwarding table in accordance with the ordered mode comprises updating the hardware forwarding table to implement a consistent ordering of next hop devices listed in the hardware forwarding table as specified by the corresponding software forwarding table.

9. A method of operating a network device coupled to one or more next hop devices, the method comprising:

in response to a link between the network device and the one or more next hop devices being disconnected or established, updating a software forwarding table stored on the network device, the software forwarding table listing next hop devices currently connected to the network device for a given destination prefix;

in response to updating the software forwarding table, determining whether the updated software forwarding table is at capacity;

in response to determining that the updated software forwarding table is not at capacity, updating a hardware forwarding table corresponding to the given destination prefix in accordance with a first mode, wherein the hardware forwarding table lists a plurality of next hop devices to which the network device concurrently conveys, via a plurality of links, traffic flows based on the next hop devices listed in the software forwarding table, wherein the first mode takes into account a prior state of the hardware forwarding table to minimize disruption to existing traffic flows for the given destination prefix; and in response to determining that the updated software forwarding table is at capacity, updating the hardware forwarding table corresponding to the given destination prefix in accordance with a second mode, different than the first mode, that disregards the prior state of the hardware forwarding table to implement a consistent ordering of next hop devices listed in the hardware forwarding table.

10. A method of operating a network comprising:

using a first network device to convey data packets to a first destination address corresponding to a given destination prefix;

using a second network device, parallelly situated with the first network device, to convey data packets to a second destination address corresponding to the given destination prefix;

subsequent to a link to the first network device being established or disconnected, updating a first hardware forwarding table on the first network device for the given destination prefix in accordance with first and second modes based on whether the first software forwarding table on the first network device for the given destination prefix is at capacity, wherein the first hardware forwarding table lists a first plurality of next hop devices to which the first network device distributes traffic flows via a first plurality of links; and subsequent to a link to the second network device being established or disconnected, updating a second hardware forwarding table on the second network device for the given destination prefix in accordance with the first and second modes based on whether the second software forwarding table on the second network device for the given destination prefix is at capacity, wherein the second hardware forwarding table lists a second plurality of next hop devices to which the second network device distributes traffic flows via a second plurality of links, wherein:

the first mode comprises a resilient mode that analyzes previous states of the first and second hardware forwarding tables to minimize disruption to existing traffic flows to destination addresses corresponding the given destination prefix; and the second mode comprises an ordered mode that disregards the previous states of the first and second hardware forwarding tables so that an order of the first plurality of next hop devices listed in the first hardware forwarding table is consistent with an order of the second plurality of next hop devices listed in the second hardware forwarding table.

11. The method of claim 10, wherein the first and second hardware forwarding tables are updated in accordance with the ordered mode in response to determining that the first and second software forwarding tables are at capacity.

12. The method of claim 11, wherein the first and second hardware forwarding tables are updated in accordance with the resilient mode in response to determining that the first and second software forwarding tables are below capacity.

* * * * *